United States Patent
Tayama et al.

(10) Patent No.: US 10,325,499 B2
(45) Date of Patent: Jun. 18, 2019

(54) APPROACHING-BODY WARNING DEVICE FOR AUTOMOBILE

(71) Applicants: Shuichi Tayama, Tokyo (JP); IMAGE CO., LTD., Tokyo (JP)

(72) Inventors: Shuichi Tayama, Tokyo (JP); Yasuhisa Nakajima, Tokyo (JP)

(73) Assignees: Shuichi Tayama, Tokyo (JP); IMAGE CO., LTD., Tokyo (JP)

( * ) Notice: Subject to any disclaimer, the term of this patent is extended or adjusted under 35 U.S.C. 154(b) by 90 days.

(21) Appl. No.: 15/549,839

(22) PCT Filed: Feb. 2, 2016

(86) PCT No.: PCT/JP2016/053076
§ 371 (c)(1),
(2) Date: Aug. 9, 2017

(87) PCT Pub. No.: WO2016/132891
PCT Pub. Date: Aug. 25, 2016

(65) Prior Publication Data
US 2018/0033307 A1    Feb. 1, 2018

(30) Foreign Application Priority Data
Feb. 16, 2015   (JP) .................................. 2015-027143

(51) Int. Cl.
*G08G 1/16*   (2006.01)
*B60Q 5/00*   (2006.01)
(Continued)

(52) U.S. Cl.
CPC ............ *G08G 1/166* (2013.01); *B60Q 5/005* (2013.01); *B60Q 9/008* (2013.01); *B60R 1/00* (2013.01);
(Continued)

(58) Field of Classification Search
None
See application file for complete search history.

(56) References Cited

U.S. PATENT DOCUMENTS

2011/0293145 A1* 12/2011 Nogami .................... B60R 1/00
382/103
2012/0075117 A1* 3/2012 Kaiser .................. G08G 1/0965
340/902
(Continued)

FOREIGN PATENT DOCUMENTS

JP    2002-133596 A    5/2002
JP    2002133596    *    5/2002
(Continued)

OTHER PUBLICATIONS

PCT/ISA/210, "International Search Report for International Application No. PCT/JP2016/053076" dated Mar. 29, 2016.

*Primary Examiner* — Christopher Braniff
(74) *Attorney, Agent, or Firm* — Manabu Kanesaka

(57) ABSTRACT

An object is to provide an approaching-body warning device capable of causing a drive to recognize, with enhanced reality, a direction and a location of a detection target approaching to an own vehicle. It is provided with a detection system including cameras, a radar sensor, and the like for detecting detection targets approaching to an own vehicle from various directions. A plurality of speakers is arranged in a cabin of the own vehicle to surround a driver. When the detection system determines that a detection target is approaching from any of various directions, an audio control unit provides, to the driver, enhanced reality of the approaching detection target by producing warning sound with surround signals output to a surround stereo audio system to form a sound field corresponding to an approaching direction.

15 Claims, 12 Drawing Sheets

(51) Int. Cl.
  *B60Q 9/00* (2006.01)
  *B60R 1/00* (2006.01)
  *G08G 1/04* (2006.01)
  *H04R 5/04* (2006.01)
  *G06T 7/55* (2017.01)
  *B60R 11/02* (2006.01)
  *H04S 7/00* (2006.01)
  *H04S 5/02* (2006.01)
  *H04R 3/00* (2006.01)
  *H04R 1/40* (2006.01)
  *G01S 13/86* (2006.01)

(52) U.S. Cl.
  CPC ............. *B60R 11/02* (2013.01); *G06T 7/55* (2017.01); *G08G 1/04* (2013.01); *G08G 1/16* (2013.01); *H04R 1/40* (2013.01); *H04R 3/00* (2013.01); *H04R 5/04* (2013.01); *H04S 5/02* (2013.01); *H04S 7/00* (2013.01); *B60R 2300/105* (2013.01); *B60R 2300/301* (2013.01); *B60R 2300/8093* (2013.01); *G01S 13/867* (2013.01); *G06T 2207/10044* (2013.01); *G06T 2207/30261* (2013.01); *H04R 2499/13* (2013.01)

(56) References Cited

U.S. PATENT DOCUMENTS

2012/0253629 A1   10/2012   Maruyama
2013/0147953 A1*   6/2013   Rao .................. B60R 1/00
                                                           348/148

FOREIGN PATENT DOCUMENTS

| JP | 2004-062874 A |   | 2/2004 |
| JP | 2004062874    | * | 2/2004 |
| JP | 2012-146316 A |   | 8/2012 |
| JP | 2012-206700 A |   | 10/2012 |

* cited by examiner

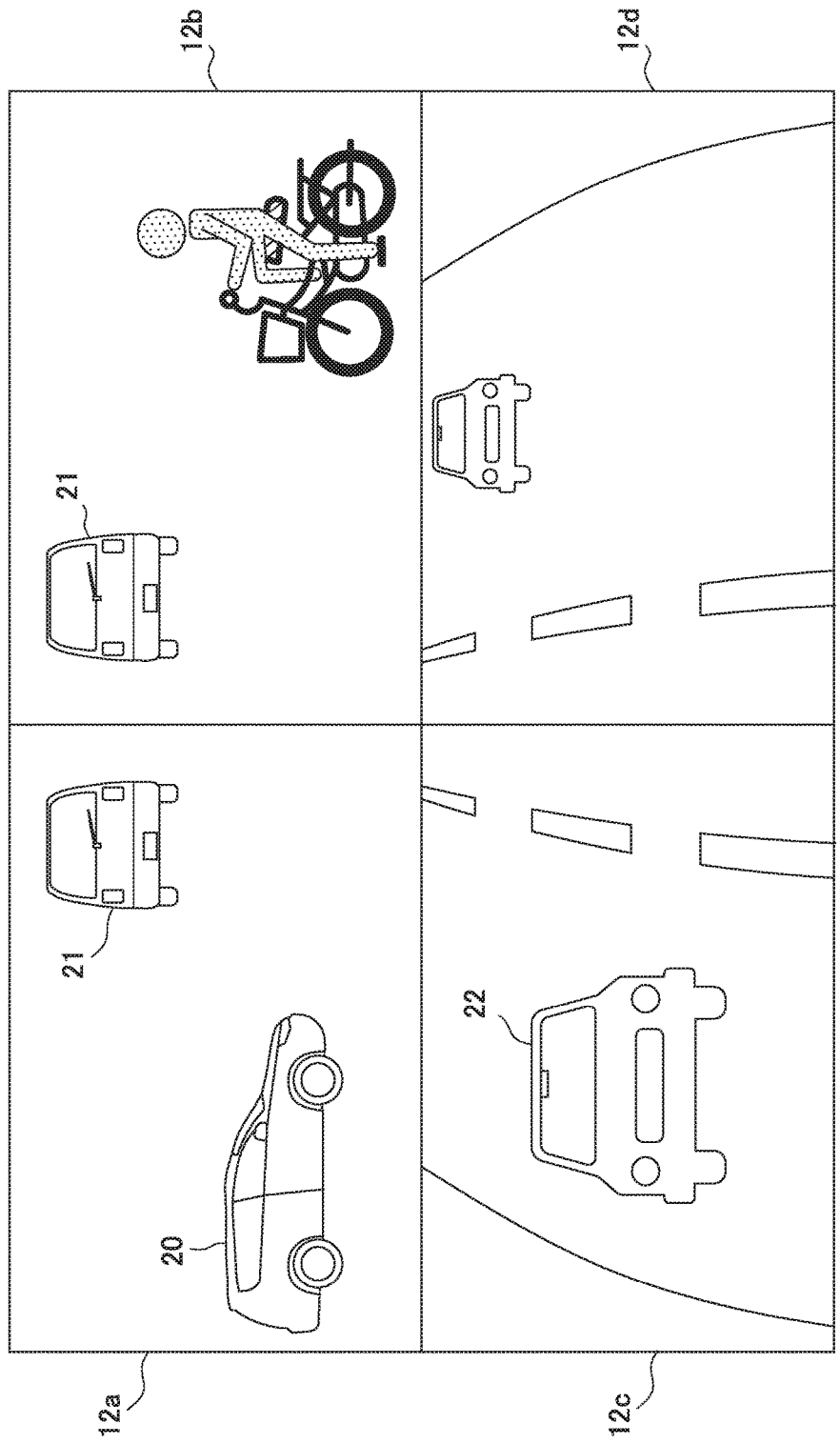

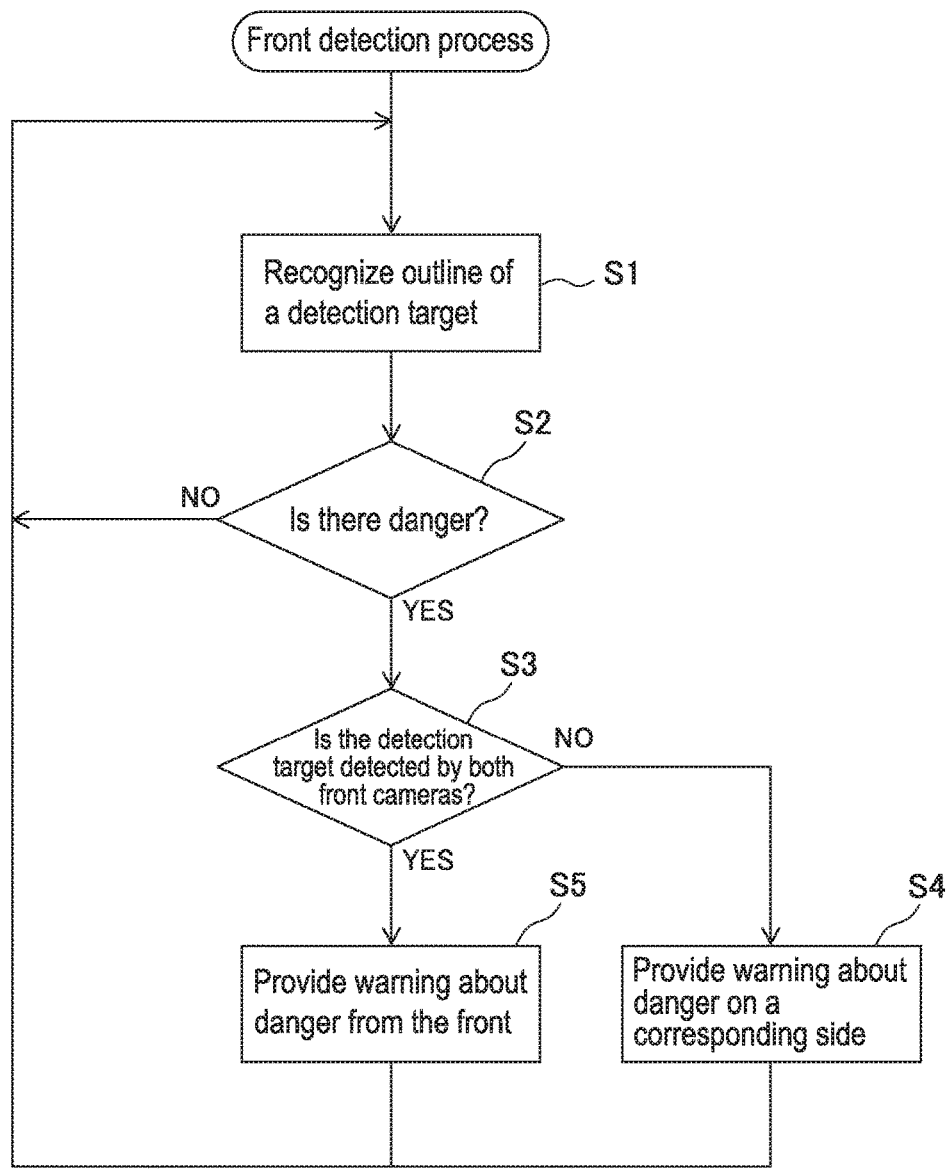

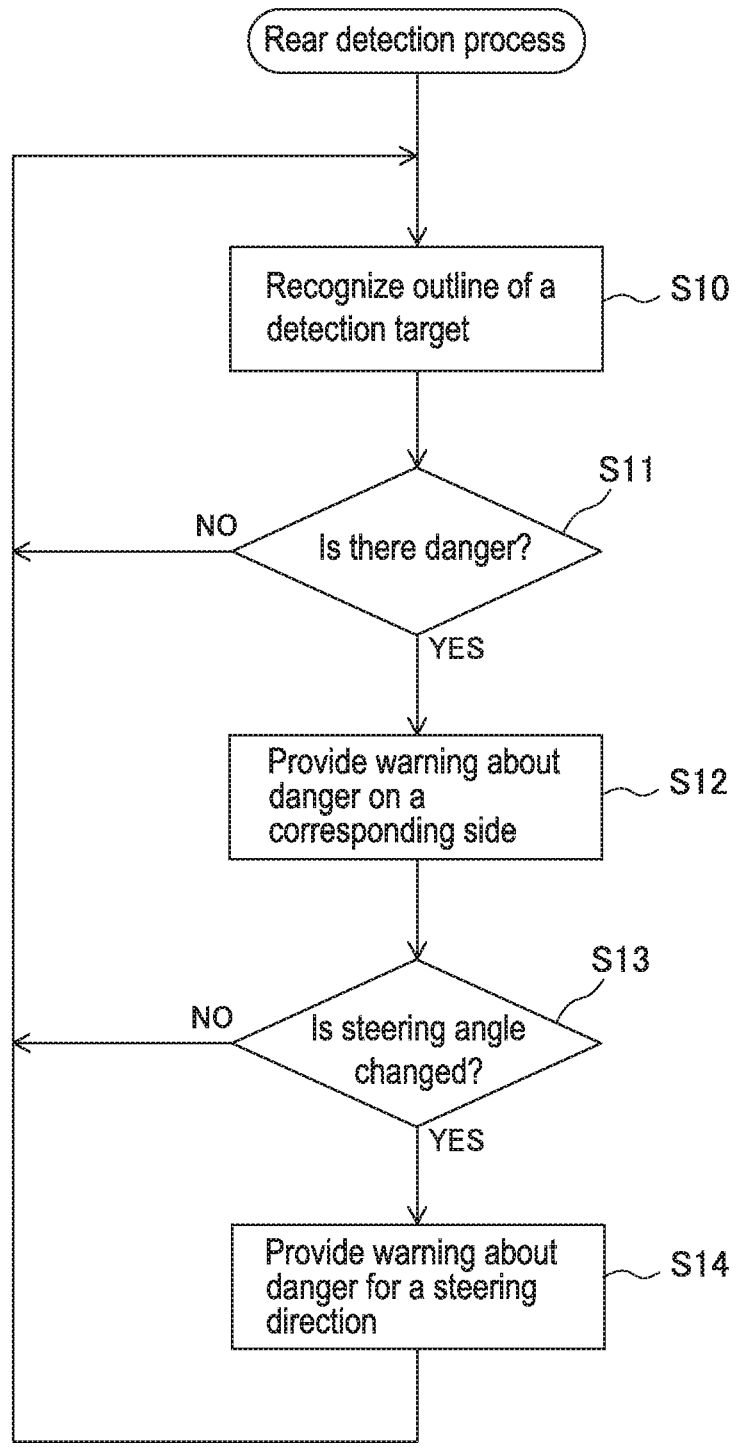

FIG. 6A
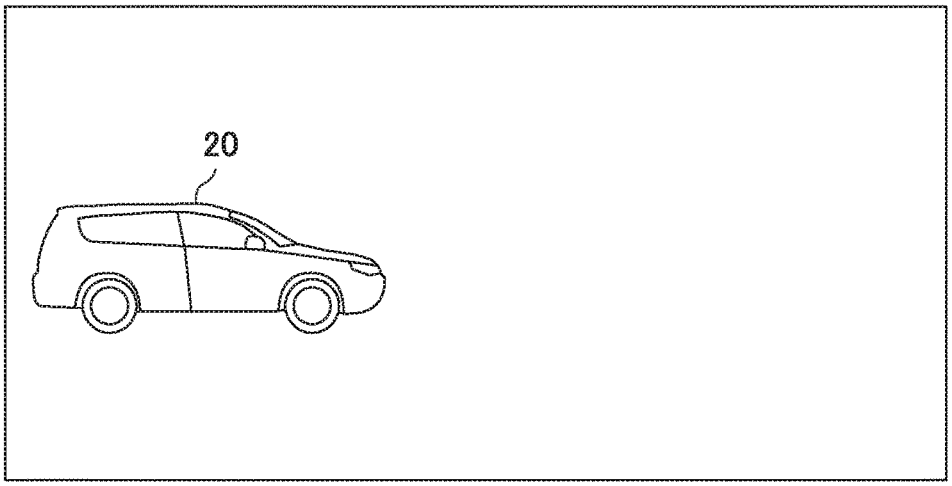
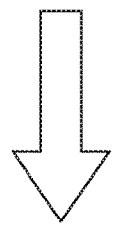
FIG. 6B
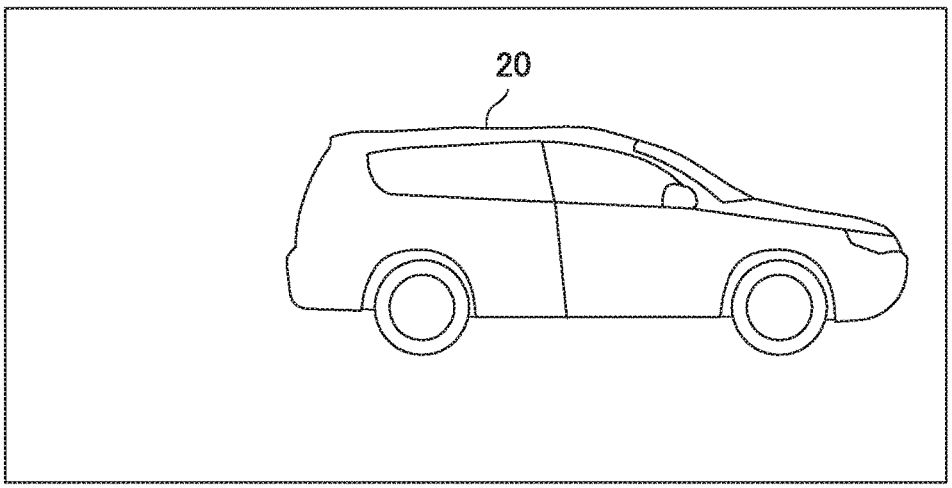

APPROACHING-BODY WARNING DEVICE FOR AUTOMOBILE

RELATED APPLICATIONS

The present application is National Phase of International Application No. PCT/JP2016/053076 filed Feb. 2, 2016, and claims priority from Japanese Application No. 2015-027143, filed Feb. 16, 2015, the disclosure of which is hereby incorporated by reference herein in its entirety.

TECHNICAL FIELD

The present invention relates to an approaching-body warning device that warns a driver about presence of an approaching object when a travelling object such as another vehicle and a bicycle is approaching toward an own vehicle from an area surrounding the own vehicle as being mounted thereon.

BACKGROUND ART

In the related art, there has been known an approaching-body warning device of such a kind as described below (e.g., see Patent Literature 1). The approaching warning device monitors rear areas on the right and left sides of an automobile with two cameras and displays on separate monitors on the right and left in real time. Then, when it is determined that the own vehicle is in a dangerous situation based on either or both of a distance and a relative speed to an automobile approaching from the rear while monitoring the approaching automobile with a radar sensor arranged on the back of the own vehicle, an image that calls an attention for presence of the approaching automobile is superimposed, for example on the left monitor screen. Further, in Patent Literature 1, it is disclosed that warning sound is produced from a speaker, out of right-left stereo-type speakers, on the side where presence of the automobile approaching from the rear is recognized along with the superimposing.

Further, it has been known a device, for obstacles and automobiles at the front and, in particular, on both sides, that outputs warning information for calling attention to notify presence of danger through right-left lamps and speakers based on target information obtained from reflection waves of radar waves that is radiated thereby (for example, see Patent Document 2).

CITED LITERATURE

Patent Literature

Patent Literature 1: Japanese Patent Application Laid-Open No. 2009-214656
Patent Literature 2: Japanese Patent Application Laid-Open No. 2012-216176

SUMMARY OF THE INVENTION

According to Patent Literatures 1 and 2, warning sound is produced with a speaker when danger around the own vehicle is detected. However, it is difficult to promptly recognize in which direction and in what degree danger is impending to the own vehicle. Accordingly, there may be judgement delay in case of emergency.

In view of the above, an object of the present invention is to provide an approaching-body warning device capable of causing a driver to recognize, with enhanced reality, a direction and location of a detection target approaching to an own vehicle.

To solve the above problem, an approaching-body warning device of the present invention includes a detection system configured to detect a detection target being an automobile, a bicycle, a person, an animal, or the like that approaches to a travelling own vehicle from a direction of all directions; a surround stereo audio system including a plurality of speakers arranged in the own vehicle; and an audio control unit configured to control the surround stereo audio system as storing a plural kinds of warning sound source signals. Here, the audio control unit controls a volume of the surround stereo audio system so that single warning sound selected from the warning sound sources is audible at a driver seat of the own vehicle in a direction of approaching of the detection target being the automobile detected by the detection system when the detection system detects the detection target approaching to the own vehicle in one or plural directions.

Here, the detection system is configured of one or a combination of a radar sensor system, one or plural imaging camera systems and/or a satellite image processing system.

In the above, it is preferable that the radar sensor system is one or a combination of a millimeter-wave radar, a micrometer-wave radar, a laser radar, an infrared radiation sensor, and an ultrasonic sensor. In this case, the radar sensor system includes a radar sensor configured to detect the detection target, and an arithmetic unit configured to calculate an inter-vehicle distance and a relative speed from a detection output of the radar sensor and a speed of the own vehicle and to evaluate approaching of the detection target.

Meanwhile, the imaging camera system includes pairs of cameras to take images on the right and/or left at the front and rear of the own vehicle, each pair thereof being arranged at the front and rear of the own vehicle, and a front image recognition unit configured to evaluate approaching of the detection target from the front by performing an image recognition process on images taken serially by the cameras.

In the above, it is preferable to include an arithmetic unit configured to measure an approaching speed by calculating a distance between the detection target and the own vehicle based on detection of a deviation between two image signals from the corresponding pair of cameras and calculating differential of the calculated distance, the cameras of each pair that configures the imaging camera system being arranged at a predetermined interval.

Further, the satellite image processing system includes an arithmetic unit configured to calculate a distance between the detection target and the own vehicle based on image data in the vicinity of the own vehicle transmitted from a satellite orbiting the earth and to measure an approaching speed by calculating differential of the calculated distance.

Here, the audio control unit controls the surround stereo audio system so that a frequency or a volume of the warning sound is varied in accordance with approaching of the detection target. Accordingly, the driver is provided with a sound field in which approaching of the detection target is strongly recognized.

Further, the audio control unit controls the surround stereo audio system so that, when the warning sound is produced intermittently at intervals, the intervals become short in accordance with approaching of the detection target. According to the above as well, the driver is provided with a sound field in which approaching of the detection target is strongly recognized.

In the above, the audio control unit controls the surround stereo audio system so that, when detection targets are detected as approaching in different directions respectively, sound having different tone colors are concurrently produced as selecting warning sound sources each having a different basic waveform in accordance with a corresponding direction. According to the above, the driver can separately recognize the detection targets approaching in different directions respectively.

In the above, when the detection system detects approaching of the detection target during the surround stereo audio system is replaying audio, the audio control unit switches from the audio replaying to replaying of the warning sound source. In contrast, when the detection system detects approaching of the detection target during while the surround stereo audio system is not in operation, the audio control unit controls the surround stereo audio system to replay the warning sound source.

Further, when the detection system determines that the detection target is approaching on the right or left traffic lane from the rear and the own vehicle is about to be moved to the traffic lane, the audio control unit controls the surround stereo audio system to produce the warning sound. Accordingly, a drive operation that causes danger can be prevented in advance.

Further, when the detection system determines that the detection target is present at the rear in a state that a transmission gear of the own vehicle is at a reverse position, the audio control unit controls the surround stereo audio system to produce the warning sound. Accordingly, safety in reverse travelling can be aurally recognized.

According to the approaching-body warning device of the present invention, warning sound is produced with a surround stereo audio system to form a sound field in which a driver feels distance sense in accordance with a direction in which a detection target approaches and a distance to the detection target. Accordingly, it is possible to provide tense sense and caution sense to the driver when the detection target approaches to a close range to the own vehicle. Thus, it is possible to warn a driver with enhanced reality and to improve efficiency of drive assist.

BRIEF DESCRIPTION OF THE DRAWINGS

FIG. 3 is a schematic explanatory view of a screen example of a display.

FIG. 4 is a flowchart of a processing operation of front detection with a front image recognition unit.

FIG. 5 is a flowchart of a processing operation of rear detection with a rear image recognition unit.

FIGS. 6A and 6B are schematic explanatory views of two-frame images for evaluating danger due to approaching of an automobile.

EMBODIMENTS OF THE INVENTION

Figure 1:
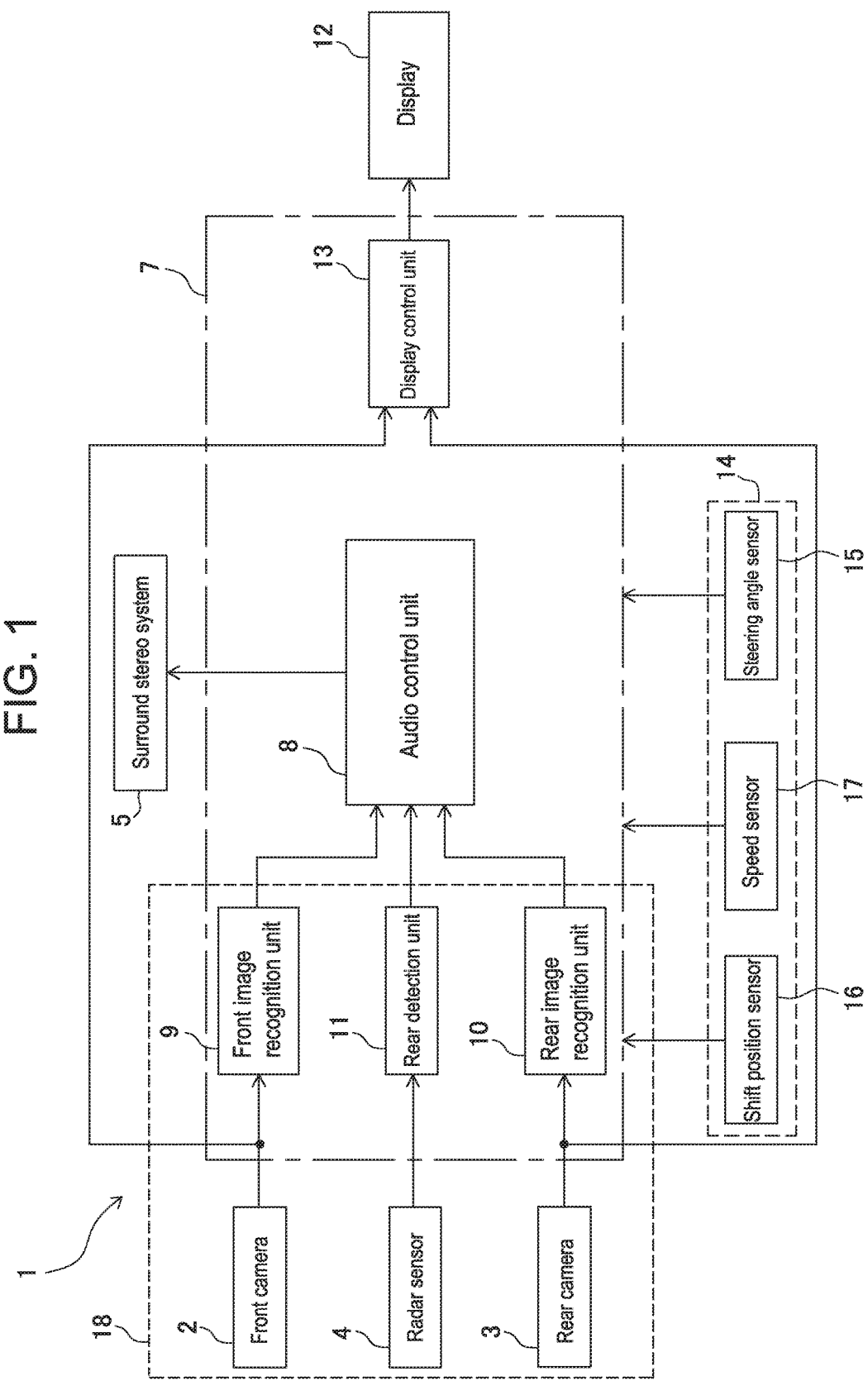
FIG. 1 is a structural block diagram of an approaching-body warning device according to an embodiment of the present invention.
Figure 2:
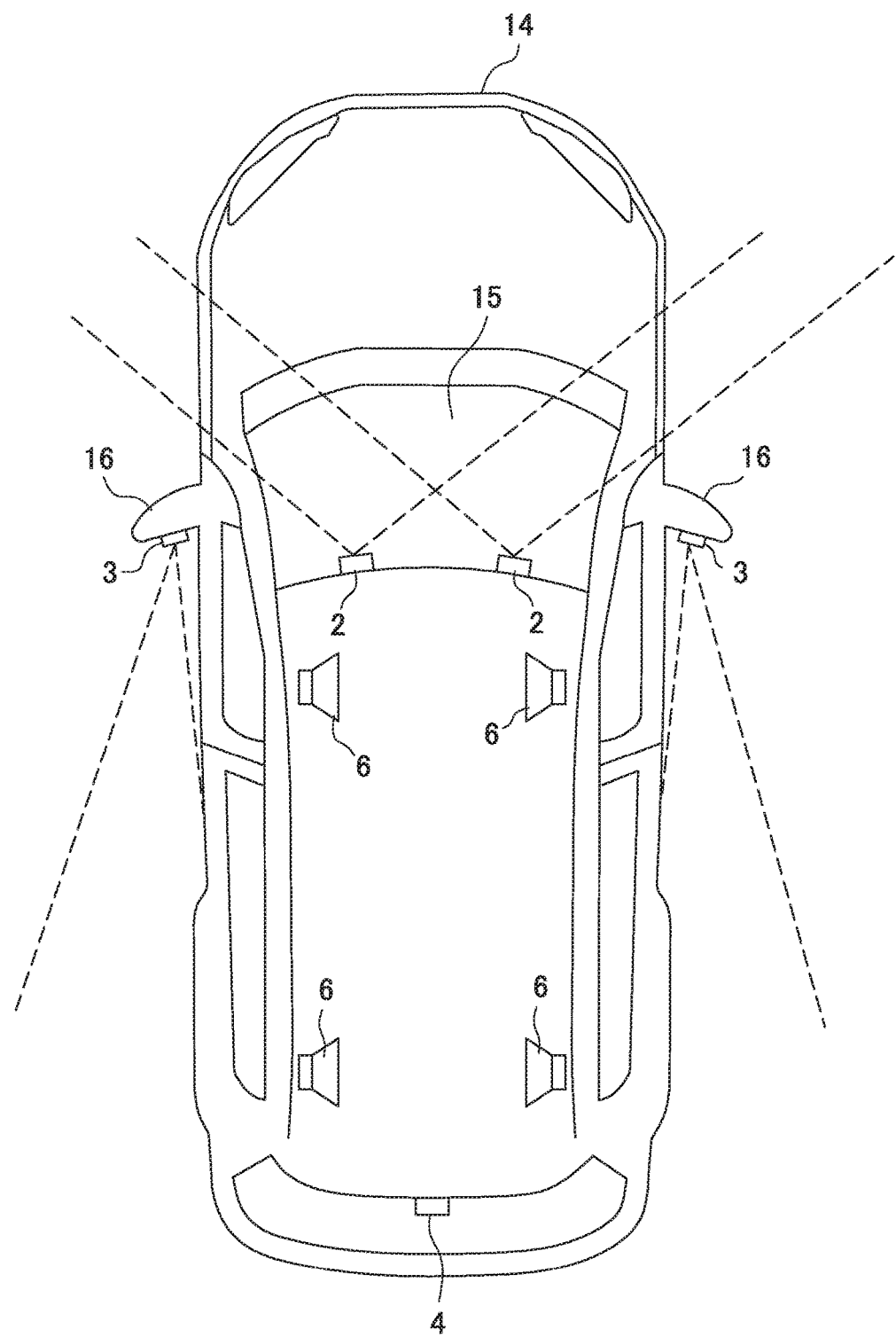
FIG. 2 is a plane view of an automobile that includes the approaching-body warning device.

Embodiments of the present invention will be described with reference to the drawings. FIG. 1 is a structural block diagram of an approaching-body warning device 1 according to an embodiment and FIG. 2 is a plane view of an automobile indicating location of each element. As illustrated in the drawings, the approaching-body warning device 1 includes a right-left pair of front cameras 2 and a right-left pair of rear cameras 3 that are arranged respectively to detect an automobile, a bicycle, a person, an animal, or the like (hereinafter, called a detection target) approaching to an own travelling vehicle 14 in each of various directions, a radar sensor 4, a display 12 that displays images taken by the cameras 2, 3, a surround stereo audio system 5 having a plurality of speakers, and a controller 7. Here, the controller 7 is connected to a steering angle sensor 15, a shift position sensor 16, and a speed sensor 17 that are arranged at a drive system 14a of the own vehicle 14 to receive signals therefrom.

Each of cameras 2, 3 is structured with a CCD camera, a CMOS camera, or the like. As illustrated in FIG. 2, the front cameras 2 are arranged as stereo cameras at the right and left of a front glass 15 of the vehicle 14. The front cameras 2 are capable of detecting a detection target rushing out from the lateral front with a widened angle of view as well as three-dimensionally recognizing a detection target in front of the vehicle 14. Further, the rear cameras 3 are attached, for example, to lower sections of right-left door mirrors 16 respectively to ensure lateral rear view of the vehicle 14. Here, the cameras 2, 3 are configured to output image data taken at predetermined time intervals to the controller 7.

The display 12 displays images transmitted from the front cameras 2 and the rear cameras 3 based on instructions from the controller 7. As schematically illustrated in FIG. 3, a screen thereof is divided into four display areas. Images taken by the right-left front cameras 2 are displayed at upper right-left display areas 12a, 12b, respectively. Images taken by the right-left rear cameras 3 are displayed at lower right-left display areas 12c, 12d. Owing to selecting any of the display areas 12a, 12b, 12c, and 12d, it is also possible to display only the displayed image at the selected display area in full screen.

The radar sensor 4 is arranged at a rear center of the own vehicle 14 to perform detection at a region straight behind the own vehicle 14. Since the region straight behind the own vehicle 14 is blind with arrangement of the rear cameras 3 in the present example, the region straight behind the own vehicle 14 is to be detected by the radar sensor 4. Examples of the radar sensor 4 include a millimeter-wave radar, a micrometer-wave radar, a laser radar, an infrared radiation sensor, and an ultrasonic sensor. The present example adopts a laser radar sensor configured of a laser diode that generates laser light and a light receiving portion that receives laser light.

The surround stereo audio system 5 includes a plurality of speakers 6 in a cabin in a manner to surround a driver. With the surround method using the plurality of speakers 6, the controller 7 performs to cause each speaker 6 to output sound to form a three-dimensional sound field in accordance with a distance to and a location of a detection target detected by any of the cameras 2, 3 and the radar sensor 4. In the case of forming a 5.1-channel surround stereo audio system, a center speaker is arranged in addition to four speakers respectively arranged at the right and left of front seats and the right and left of rear seats, being five speakers in total. In the case of forming a 6.1-channel surround stereo audio system, three speakers are arranged as rear speakers similarly to the front side. In the present example, two speakers are arranged respectively to the front side and the rear side, being four speakers in total.

The controller 7 includes a microcomputer including a CPU, a ROM, and a RAM. The CPU performs processes as an audio control unit 8, a front image recognition unit 9, a rear image recognition unit 10, a rear detection unit 11, and a display control unit 13 by executing programs stored in the ROM. The front image recognition unit 9, the rear image recognition unit 10, and the rear detection unit 11 configure a detection system 18 along with the cameras 2, 3 and the radar sensor 4.

The front image recognition unit 9 and the rear image recognition unit 10 evaluate approaching of a detection target, respectively, by performing an image recognition process on images taken by the cameras 2, 3. The controller 7 previously memorizes, in a reference data file (not illustrated), image features of detection targets such as various automobiles, bicycles, motorcycles, and pedestrians. Then, the front image recognition unit 9 and the rear image recognition unit 10 detect a detection target by recognizing an image feature from the taken images.

The audio control unit 8 is capable of outputting sound using the speakers 6 with a surround method that forms a three-dimensional sound field fora driver so that warning sound is audible from a direction in which a detection target detected by the detection system 18 is approaching to the own vehicle 14. A plurality of warning sound sources each having sound data with different sound quality are stored in a memory of the sound control unit 8. The sound control unit 8 selects a warning sound source in accordance with an approaching situation of the detected detection target to output warning sound with different sound quality. The sound quality in this case represents frequencies, sound volumes, or tone colors (shapes of basic waveforms).

In the following, operations of the approaching-body warning device 1 will be described while describing details of the controller 7.

First, a processing operation of front detection with the front image recognition unit 9 will be described with reference to a flowchart of FIG. 4. The front image recognition unit 9 performs, based on image data output from the front cameras 2, the image recognition process such as pattern recognition using a known image processing program with reference to the reference data file and recognizes an outline of a detection target (step 1).

Specifically, presence or absence of approaching of the recognized detection target is determined based on size variation of the outline thereof by serially comparing latest image data taken by the front cameras 2 with previous image data, and presence or absence of danger is determined (step S2). The above is described in the following with an automobile 20 illustrated in FIG. 3. When an outline of the automobile 20 on an image (FIG. 6B) in the latest image data is larger than the outline of the automobile 20 on an image (FIG. 6A) in previous image data, it is determined that the automobile 20 is approaching to the own vehicle 14. In contrast, when the outline thereof in the latest image data is smaller than the outline thereof in the previous image data, it is determined that the vehicle 20 is getting away from the own vehicle 14. In the case of determination that the vehicle 20 is approaching to the own vehicle 14, it is determined that there is danger of collision when a ratio of the outline of the automobile 20 to the entire image exceeds a first predetermined value.

A large ratio of the automobile 20 to the entire image represents that the distance between the own vehicle 14 and the automobile 20 is getting short. The first predetermined value is previously set as a value of a ratio of the outline of the vehicle 20 to the entire image when the automobile 20 approaches to a close range to be determined as being dangerous. The first predetermined value is set variously for each kind of detection targets. For example, a first predetermined value for a person or a bicycle as a detection target is smaller than that for an automobile. In addition, it is set variously in accordance with sizes of automobiles. For recognizing a large-size vehicle such as a bus and a truck based on shapes of outlines of detection targets, the front image recognition unit 9 can select and refer to a first predetermined value that corresponds thereto.

Returning to the flowchart of FIG. 4, when it is determined that there is danger of collision (YES, in step S2), the front image recognition unit 9 determines whether both the right-left front cameras 2 capture the automobile 20 (step S3). In the example illustrated in FIG. 3, the automobile 20 is displayed only at the display area 12a. Accordingly, it can be determined that there is danger of rushing-out of the automobile 20 from the left side. Then, the front image recognition unit 9 outputs a signal that indicates presence of danger from the front-left side to the audio control unit 8 (NO, in step S3) and performs a warning process indicating that the automobile 20 is approaching on this side (step S4).

In the process of step S4, the audio control unit 8 selects a warning sound source and outputs, to the surround audio system 5, surround signals so that the warning sound with the warning sound source forms a sound field in which a driver is aurally provided with a sense of presence of approaching in accordance with the location of the automobile 20 on the front-left side.

Here, the audio control unit 8 varies sound quality of the warning sound in accordance with the distance to the approaching automobile 20. For example, the sound quality is varied with frequencies so as to produce low-pitch warning sound with a low frequency when the automobile 20 is far away and produce high-pitch warning sound with an increased frequency in accordance with approaching of the automobile 20. Thus, the driver is caused to feel danger. Further, the sound volume is set small when the automobile 20 is far away and is set to be large in accordance with approaching of the automobile 20.

Not limited to continuous sound, the warning sound may be produced intermittently. In this case, it is possible to provide tense feeling to the driver by adjusting intervals in accordance with approaching of the detection target. For example, it is possible to cause the driver to feel danger by shortening the intervals in accordance with approaching of the automobile 20.

Further, in the case that the warning sound is to be produced intermittently with a combination of sound quality due to frequencies and sound volumes, it is preferable to combine intervals thereof so that the audio control unit 8 is configured to be capable of producing warning sound being more recognizable for the driver.

According to the above, it is possible to cause the driver to feel distance sense in accordance with amounts of distance to the detection target and to provide warning to the driver more realistically and instinctually. Further, in the above, the plurality of speakers 6 are arranged to surround the driver and the speakers 6 are caused to output warning sound to form a three-dimensional sound field in accordance with a distance to and a location of the detection target with a surround method. Accordingly, it is possible to inform the driver of the location of the detection target and the like as well with enhanced reality. Thus, it is possible to cause the driver to strongly recognize presence of danger of collision with the automobile 20 approaching.

At that time, when the surround stereo audio system 5 is replaying an audio source, the surround stereo audio system 5 is controlled by the audio control unit 8 to produce warning sound while interrupting the replaying. In contrast, when approaching of the detection target is detected while the surround stereo audio system 5 is not in operation, the audio control unit 8 activates the surround stereo audio system 5 for replaying the warning sound source.

Similarly, the front image recognition unit 9 also detects an outline of an automobile 21 that is captured by both the right-left front cameras 2 (step S1). In the case of determination that the automobile 21 is approaching, it is determined that there is danger of collision when a ratio of the outline of the automobile 21 to the entire image exceeds a second predetermined value (YES, in step S2). The second predetermined value is previously set as a value of ratio of the outline of the vehicle 21 to the entire image when the automobile 21 approaches to a close range to be determined as being dangerous. Similarly to the first predetermined value, the second predetermined value is also set variously for each kind of detection targets.

Here, since the automobile 21 is captured by both the right-left front cameras 2 (YES, instep S3), a signal indicating presence of danger is output to the audio control unit 8 and a process is performed to provide warning of danger presence directly from the front (step S5).

In the process of step S5, the audio control unit 8 outputs, to the surround stereo audio system 5, surround signals so that the warning sound with the selected warning sound source forms a sound field in which the driver is aurally provided with a sense of presence of approaching in accordance with the location of the automobile 21 at the front. The above causes the driver to recognize the location of the automobile 21 at the front with enhanced reality.

Figure 7:
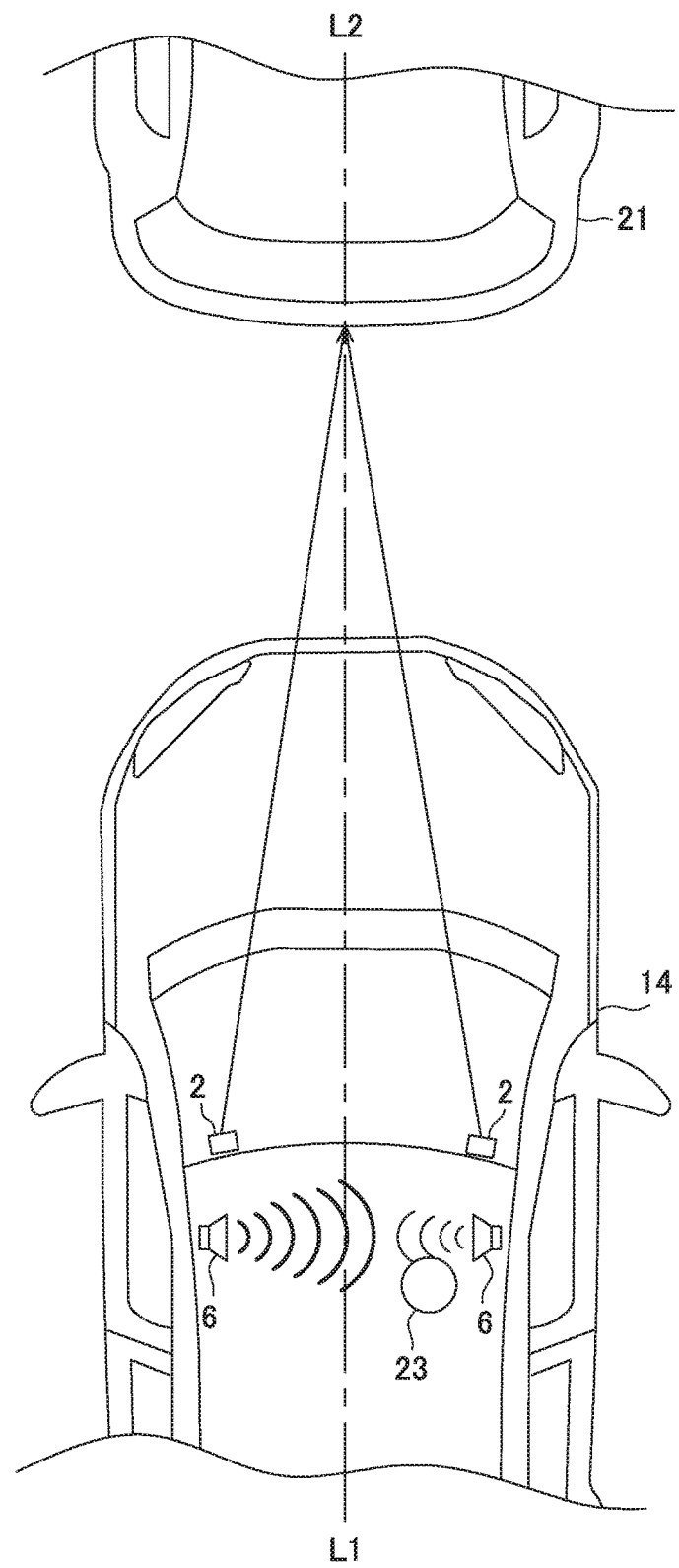
FIG. 7 is an explanatory view of a warning operation when an automobile directly at the front is approaching to a close range.

The automobile 21 is directly in front of the own vehicle 14. Here, when the own vehicle 14 has a steering wheel on the right side, the automobile 21 is on the front-left side from the driver. The audio control unit 8 forms a sound field to provide the above feeling to the driver. Specifically, the front image recognition unit 9 recognizes relative positions of the automobile 21 and the own vehicle 14. For example, when the center line L1 of the own vehicle 14 and the center line L2 of the automobile 21 coincide with each other in the traveling direction as illustrated in FIG. 7, the front image recognition unit 9 outputs, to the audio control unit 8, a signal indicating that the automobile 21 is directly at the front of the own vehicle 14. According to the above, the driver 23 can aurally recognize that the automobile 21 is on the center line L1 of the own vehicle 14 in the traveling direction.

Then, when the front image recognition unit 9 recognizes that the traveling position of the automobile 21 is on a driver seat side or a front passenger seat side of the own vehicle 14, the front image recognition unit 9 outputs a signal corresponding to the traveling position thereof. Thus, owing to that the audio control unit 8 generates surround signals in accordance with the traveling position of the automobile 21 and outputs the surround signals to the surround stereo audio system 5, the driver can recognize the location of the automobile 21.

Further, it is also possible for the front image recognition unit 9 to calculate a distance between the detection target and the own vehicle 14 by detecting a deviation between two image signals from the pair of front cameras 2 being stereo cameras, to measure an approaching speed by calculating differential of the calculated distance, and to evaluate danger also based on the approaching speed.

Further, the display control unit 13 displays images captured by the right-left front cameras 2 at the display areas 12a, 12b of the display 12, so that the driver can visually recognize danger at the front.

Next, a processing operation of rear detection with the rear image recognition unit 10 will be described with reference to a flowchart of FIG. 5. Similarly to the front image recognition unit 9, the rear image recognition unit 10 performs, based on image data output from the rear cameras 3, the image recognition process with reference to the reference data file and recognizes an outline of an automobile, a pedestrian, or the like (step S10). Then, presence or absence of approaching of the detection target is determined based on size variation of the outline of the recognized automobile or pedestrian by comparing latest image data taken by the rear cameras 3 with previous image data to evaluate danger based on presence or absence of the detection target from the rear (step S11).

Since the rear cameras 3 in the present example are attached to the door mirrors, the right-left rear cameras 3 cannot capture the same detection target. Accordingly, presence or absence of approaching is to be determined for different detection targets respectively from the rear-right side and the rear-left side. Then, when the rear image recognition unit 10 recognizes a detection target or detection targets approaching from the right or left or from both thereof, the audio control unit 8 controls the surround stereo audio system 5 to form a three-dimensional sound field in accordance with a distance to and a location of the detection target(s) with a surround method.

For example, in the case that the rear image recognition unit 10 captures an automobile 22 displayed at the display area 12c in FIG. 3, it is determined that the automobile 22 is approaching to the own vehicle 14 from the rear when an outline of the automobile 22 on an image in the latest image data is larger than the outline of the automobile 22 on an image in previous image data. Then, it is determined that there is danger of collision when a ratio of the outline of the automobile 22 to the entire image exceeds a third predetermined value that is set in advance (step S11). Similarly to the first and second predetermined values, the third predetermined value represents a value of ratio of the outline of the automobile 22 to the entire image when the automobile 22 approaches to a close range to be determined as being dangerous.

When the rear image recognition unit 10 determines that the automobile 22 is approaching closer from the rear-left side, the audio control unit 8 selects a warning sound source and outputs, to the surround stereo audio system. 5, surround signals to form a sound field in which warning sound with the warning sound source is approaching from the direction. Then, owing to performing control of varying a frequency or a sound volume in accordance with a distance to the approaching detection target and control of varying intervals in the case of intermittent sound, the audio control unit 8 causes the driver to feel distance sense.

According to the above, it is possible to inform the driver of the location of the automobile 22 and the like on the rear-left side with enhanced reality. The above is the same as in the case that the rear image recognition unit 10 recognizes a detection target approaching from the rear-right side. The audio control unit 8 outputs, to the surround stereo audio system 5, surround signals to form a sound field corresponding to the direction. In this case, owing to that the audio control unit 8 selects warning sound sources so that tone colors of warning sound are different to each other for the right and left, it is possible for the driver to recognize from which side of the right and left or from both sides an automobile is approaching. Accordingly, it is preferable that tone colors of the warning sound source to be used for the right and left are set in advance to be distinguishable.

Here, danger to be determined by the rear image recognition unit 10 represents approaching of a detection target on a traffic lane that is adjacent to the own vehicle 14. Further, when the driver is about to turn a steering wheel in the direction thereto, the audio control unit 8 controls the surround stereo audio system 5 to further produce warning sound of a different tone color for emphasizing the danger.

At that time, the audio control unit 8 detects a steering operation with the steering angle sensor 15 (step S13). When variation of the steering angle due to the steering operation is detected (YES, in step S13), the audio control unit 8 warns that danger exists on the traffic line at the steering direction (step S14). The warning sound selected and output to the surround stereo audio system 5 by the audio control unit 8 is distinguishable from the warning sound produced in step S12. However, it is preferable to provide a warning comment with voice synthesis for unambiguously informing the driver. In this case as well, surround signals to form a sound field in accordance with the steering direction are output to the surround stereo audio system 5. Here, the warning sound may be produced instead of the warning sound produced in step S12 or may be produced in addition thereto.

The above-described operations of the rear image recognition unit 10 are performed in the case that the shift position sensor 16 indicates that a transmission gear of the own vehicle 14 is at a forward position. In the case that the shift position sensor 16 indicates that the transmission gear is at a reverse position, the rear image recognition unit 10 recognizes presence of a detection target and calculates a distance to the detection target. Then, the audio control unit 8 performs warning by outputting, to the surround stereo audio system 5, surround signals to form a sound field corresponding to a reverse travelling speed and a direction thereof detected by the speed sensor 17. Thus, in the case that the own vehicle 14 is reversely travelling, when the rear image recognition unit 10 recognizes presence of a detection target with the rear cameras 3, the driver is provided with a sound field that corresponds to the corresponding direction and is caused to recognize the direction in which danger is present.

According to arrangement of the rear cameras 3 in the present example, since the region straight behind the own vehicle 14 is blind, the radar sensor 4 is arranged to detect the region approximately straight behind the own vehicle 14. The rear detection unit 11 is an arithmetic unit that performs predetermined calculation based on output from the radar sensor 4 and a speed signal from the speed sensor 17 of the own vehicle 14 when presence of an automobile approaching from straight behind the own vehicle 14 is detected. After a distance and a relative speed thereto are acquired through the calculation, when the relative speed exceeds a predetermined value, the rear detection unit 11 outputs, to the audio control unit 8, a signal indicating presence of an automobile approaching from straight behind the own vehicle 14.

Then, the audio control unit 8 outputs, to the surround stereo audio system 5, surround signals to form a sound field approaching in accordance with the location of the detection target at the straight rear. According to the above, it is possible to inform the driver of the location of the automobile 21 and the like at the straight rear with enhanced reality.

In the case that a detection target approaching from the straight rear is detected by the radar sensor 4 and concurrently presence of an approaching detection target is detected by each of the rear cameras 3, that is, in the case that an detection target is approaching on each of three traffic lines on the rear side including the traffic line for the own vehicle, the audio control unit 8 selects three kinds of warning sound having different tone colors from one another and outputs, to the surround stereo audio system 5, surround signals to form a sound field approaching in each direction. Thus, the warning sound can cause the driver to pay attention to the location of the automobile 22 at the rear with enhanced reality.

Such radar sensors 4 may be arranged instead of the front cameras 2 and the rear cameras 3 for front detection and rear detection respectively as a right-left pair. Further, not limited to the radar sensor 4, a camera may be arranged at a rear center of the own vehicle 14 to be capable of detecting the region straight behind the own vehicle 14 to detect the region being blind with the rear cameras. In this case, presence of a detection target approaching at a high speed from the straight rear can be recognized by the rear image recognition unit 10 with a similar method to that in the case using the right-left rear cameras 3. At that time, the rear image recognition unit 10 outputs, to the audio control unit 8, a signal that indicates approaching of an automobile from the straight rear. Then, the audio control unit 8 selects a warning sound source and outputs, to the surround stereo audio system 5, surround signals to form a sound field as approaching from the straight rear. Then, owing to performing control of varying a frequency or a sound volume in accordance with a distance to the approaching detection target and control of varying intervals in the case of intermittent sound, the audio control unit 8 causes the driver to feel distance sense.

The detection system 18 is not limited to be configured of the front cameras 2, the rear cameras 3, the radar sensor 4, the front image recognition unit 9, the rear image recognition unit 10, and the rear detection unit 11 in the embodiment described above.

Figure 8:
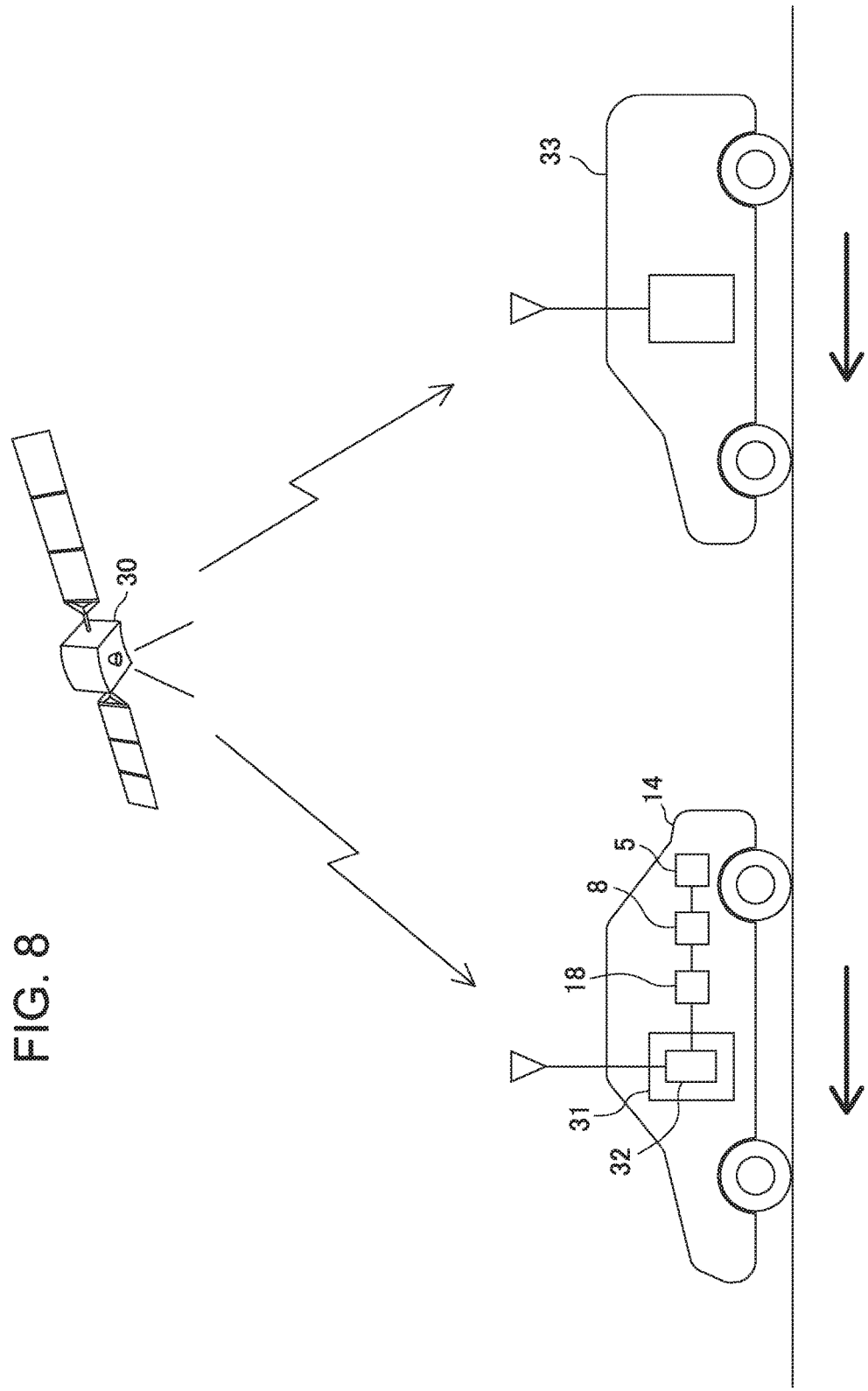
FIG. 8 is an explanatory view of a system configuration for operations of an approaching-body warning device using a GPS.

FIG. 8 illustrates an example of a detection system 18 that adopts satellite image processing system using a global positioning system (GPS). The satellite image processing system includes an arithmetic unit that measures an approaching speed, when image data in the vicinity of the own vehicle 14 is transmitted from a satellite orbiting the earth, by calculating a distance between a detection target and the own vehicle 14 and calculating differential of the calculated distance. Then, based on the approaching speed measured by the satellite image processing system, the audio control unit 8 outputs, to the surround stereo audio system 5, surround signals to form a sound field in which the detection target is approaching.

Further, owing to performing near field communication with another vehicle 33 located in an area of a region being apart from the own vehicle 14 by a certain short distance or less, the detection system 18 can detect the other vehicle 33 as a detection target. In this case, the own vehicle 14 includes a communication device 35 for performing radio communication with the outside in the controller 7 or the detection system 18 or separately therefrom. Owing to the near field communication with the other vehicle 33, the other vehicle 33 can be recognized even in the case that the other vehicle 33 cannot be detected by the cameras or the radar sensor, for example, as being behind a building and the like.

In addition to the near field communication device capable of performing communication between vehicles, it is preferable that each vehicle is capable of providing information to the other vehicle 33 in real time through the near field communication while obtaining, from a variety of sensors, a navigation device 32, and the like mounted on the own vehicle, drive information such as a current travel position, a travel speed, operations of acceleration, deceleration, and braking, a steering situation, a course and a modification thereof, a scheduled travel route, and the like. According to the above, for example, even in the case that a parked vehicle is about to start moving with an engine started, movement thereof can be predicted. Here, the drive information to be supplied to the other vehicle 33 is selected to be necessary and sufficient for enabling detection of danger and recognition of presence and degree of danger, as an object of the present invention.

Owing to that such drive information is provided from the other vehicle 33, it is possible for the detection system 18, for example, to evaluate possibility of meeting or approaching to the other vehicle 33 during travelling, to calculate a distance between the other vehicle 33 and the own vehicle 14, and to measure an approaching speed by calculating differential of the calculated distance. Then, the audio control unit 8 outputs, to the surround stereo audio system 5, surround signals to forma sound field in which the detection target is approaching based on the approaching direction, the distance, and the approaching speed that have been measured based on the drive information of the other vehicle 33 obtained in real time.

Figure 9:
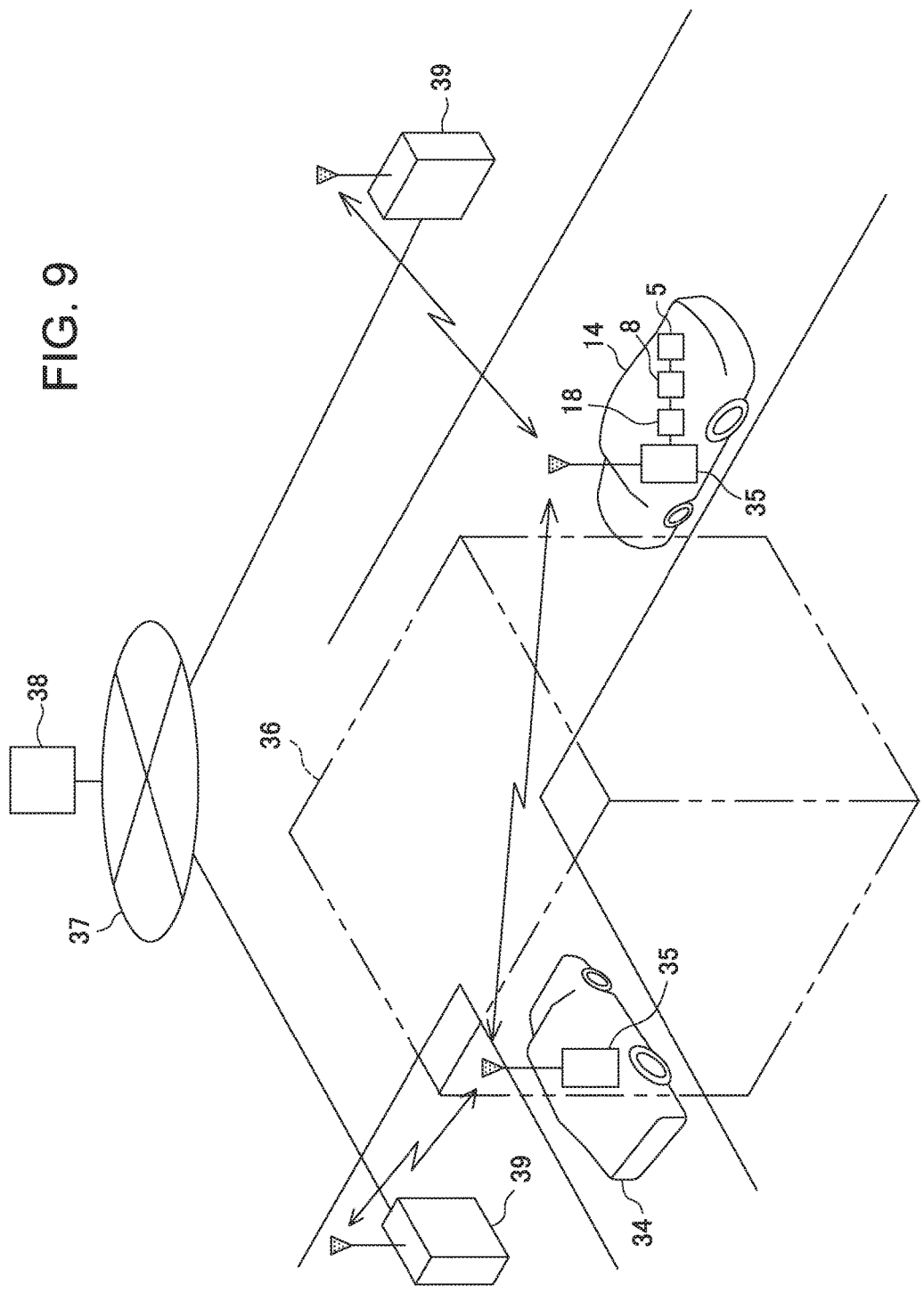
FIG. 9 is an explanatory view of a system configuration for operations of an approaching-body warning device using near field communication.

Such vehicle-obtained drive information is not limited to be supplied through direct communication between vehicles. As illustrated in FIG. 9, it is also possible that drive information is collected in a cloud server 38 from each vehicle 14, 34, for example, through the internet 37 and is downloaded as needed from the cloud server 38 to each vehicle 14, 34. In this case, communication on the drive information can be performed between each vehicle 14, 34 and the cloud server 38 through antennas 39 that are, for example, arranged along a road at some intervals.

Here, the cloud server 38 is simply required to be arranged for each area of a certain range. It is possible for the detection system 18 to obtain necessary drive information of the other vehicle 33 being a possible detection target from the cloud server 38 in the area where the own vehicle 14 is travelling, to evaluate possibility of meeting or approaching to the other vehicle 33 during travelling, to calculate a distance between the other vehicle 33 and the own vehicle 14, and to measure an approaching speed by calculating differential of the calculated distance. Then, the audio control unit 8 outputs, to the surround stereo audio system 5, surround signals to form a sound field in which the detection target is approaching based on the approaching direction, the distance, and the approaching speed that have been measured based on the drive information of the other vehicle 33 obtained through the internet.

Figure 10:
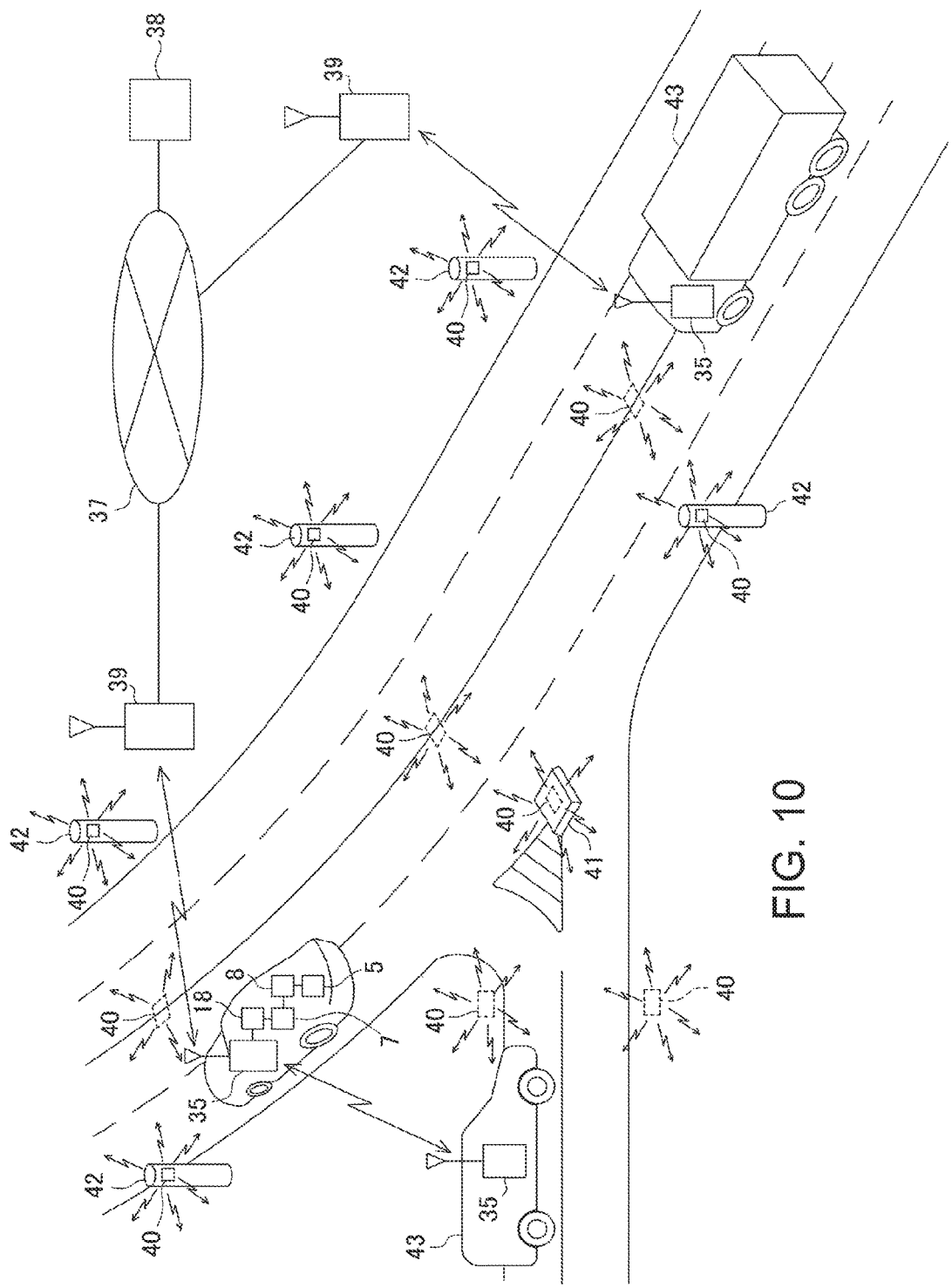
FIG. 10 is an explanatory view of a system configuration for operations of an approaching-body warning device using communication chips arranged on roads or beside roads.

FIG. 10 illustrates an example of a system that enables obtainment of information such as locations on roads, travel situations, and the like of vehicles using chip-shaped communication devices 40 (hereinafter, called communication chips) arranged along the roads at intervals. For example, each of the communication chips 40 may be buried in a roadbed or a road shoulder or may be attached to a road stud arranged on a center line of a roadway or a boundary line of a traffic lane, any pole arranged along a road shoulder or a traffic lane, or the like.

In an embodiment, the communication chips 40 have a function to transmit each chip arrangement location information stored in an own memory to the surrounding area by radio. A vehicle located in the vicinity of the communication chip 40, that is, a vehicle passing through or parking near the communication chip 40, receives the chip location information transmitted from the corresponding communication chip 40. The detection system 18 can recognize a location of the own vehicle 14 based on the chip location information.

Further, based on arrangement pattern of the communication chips 40 on a road, the detection system 18 can recognize more accurately how the own vehicle 14 travels on the road. For example, owing to detecting a positional relation and a distance between the own vehicle 14 and each communication chip 40, it is possible to determine whether the own vehicle 14 travels straightly or meanders on a road, how far the own vehicle 14 is apart from a center line, a boundary line, or a road shoulder, and the like.

In the abovementioned embodiment, in the case that another vehicle 33, especially a large-sized vehicle, being a detection target detected by the detection system 18 is approaching from the rear on an adjacent traffic lane, it is possible to determine whether a distance to the other vehicle in the width direction is sufficient, avoidance is required in advance, or attention is required to be paid. Then, the controller 7 performs prediction on presence or absence, degrees, and avoidance of danger. Then, the audio control unit 8 outputs, to the surround stereo audio system 5, surround signals to form a sound field to inform the driver of the above situations in addition to an approaching direction, a distance, and an approaching speed of the other vehicle 33 that have been detected by the detection system 18.

Further, the own vehicle 14 can provide, to the other vehicle 33, own location information obtained through radio communication with the communication chips 40 through the abovementioned inter-vehicle near filed communication in real time or through the internet from the cloud server 38 with extremely short time delay if any.

For the transmitting function of the communication chip 40, it is sufficient for the communication chip 40 to have power to the extent that a vehicle located within a range being distanced relatively short from the communication chip 40 while preventing interference with radio waves transmitted from another communication chip 40 located nearby. As a power source of the communication chip 40, it is possible to ensure by integrating a cell that can be charged, for example, with solar power, feeding power through a cable from an external power source, or generating power with radio waves transmitted by vehicles travelling nearby.

Figure 11:
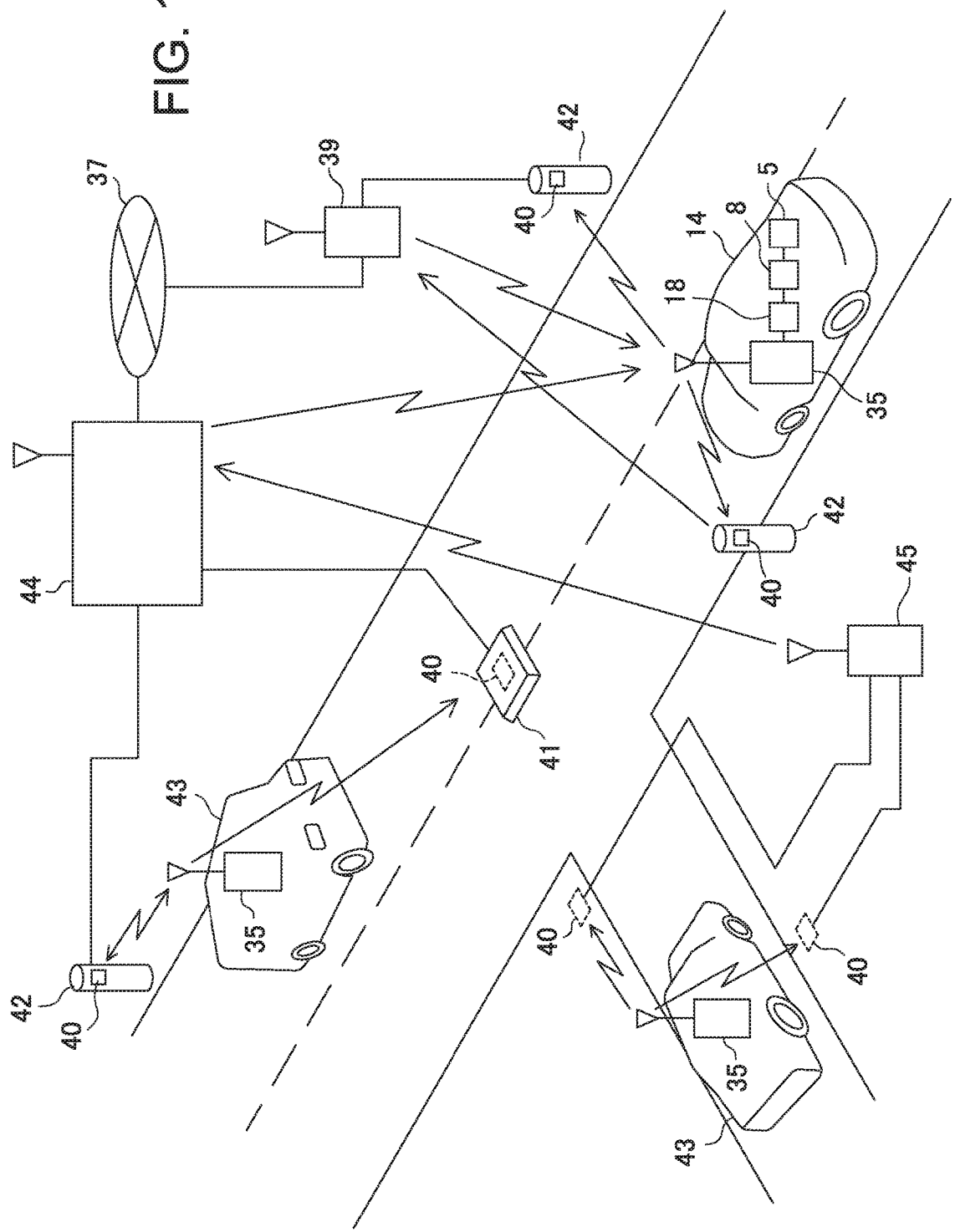
FIG. 11 is an explanatory view of another example of a system configuration for operations of an approaching-body warning device using communication chips arranged on roads or beside roads.

In addition to or separately from the abovementioned transmitting function, the communication chips 40 can have a receiving function to receive information by radio, as illustrated in FIG. 11. Each of the communication chips 40 detects that a vehicle has passed thereon or nearby by receiving radio information transmitted by the vehicle. The radio information may include, for example, an identification code of the vehicle, information of other vehicles if required, current and future travelling information, and the like.

The travelling information and the like that the communication chip 40 has obtained from a vehicle is transmitted by radio to a server in a corresponding area through an antenna that is arranged at larger intervals than those of the communication chips 40 along a road, for example. It is also possible to transmit directly to the server through a cable connected to the communication chip 40 or by radio to the server from a relay station connected to the cable.

At the server that has received the travelling information and the like of the vehicle from the communication chips 40, it is possible to recognize how fast and in which direction the vehicle travels based on timings, time intervals, and the like detected by the communication chips 40 arranged along a road. Thus, even if the abovementioned near field communication device and a variety of sensors are not mounted on the vehicle, it is possible to collect travelling information of the vehicle.

The detection system 18 obtains travelling information of the other vehicle 33 from the server in an area in which the own vehicle 14 travels through a communication device mounted thereon. The detection system 18 detects the other vehicle 33 being a possible detection target, evaluates possibility of meeting or approaching to the other vehicle 33 during travelling, calculates a distance between the other vehicle 33 and the own vehicle 14, and measures an approaching speed by calculating differential of the calculated distance. Then, the audio control unit 8 outputs, to the surround stereo audio system 5, surround signals to form a sound field in which the detection target is approaching based on the approaching direction, the distance, and the approaching speed that have been measured based on the drive information of the other vehicle 33 obtained from the road through the internet.

Figure 12:
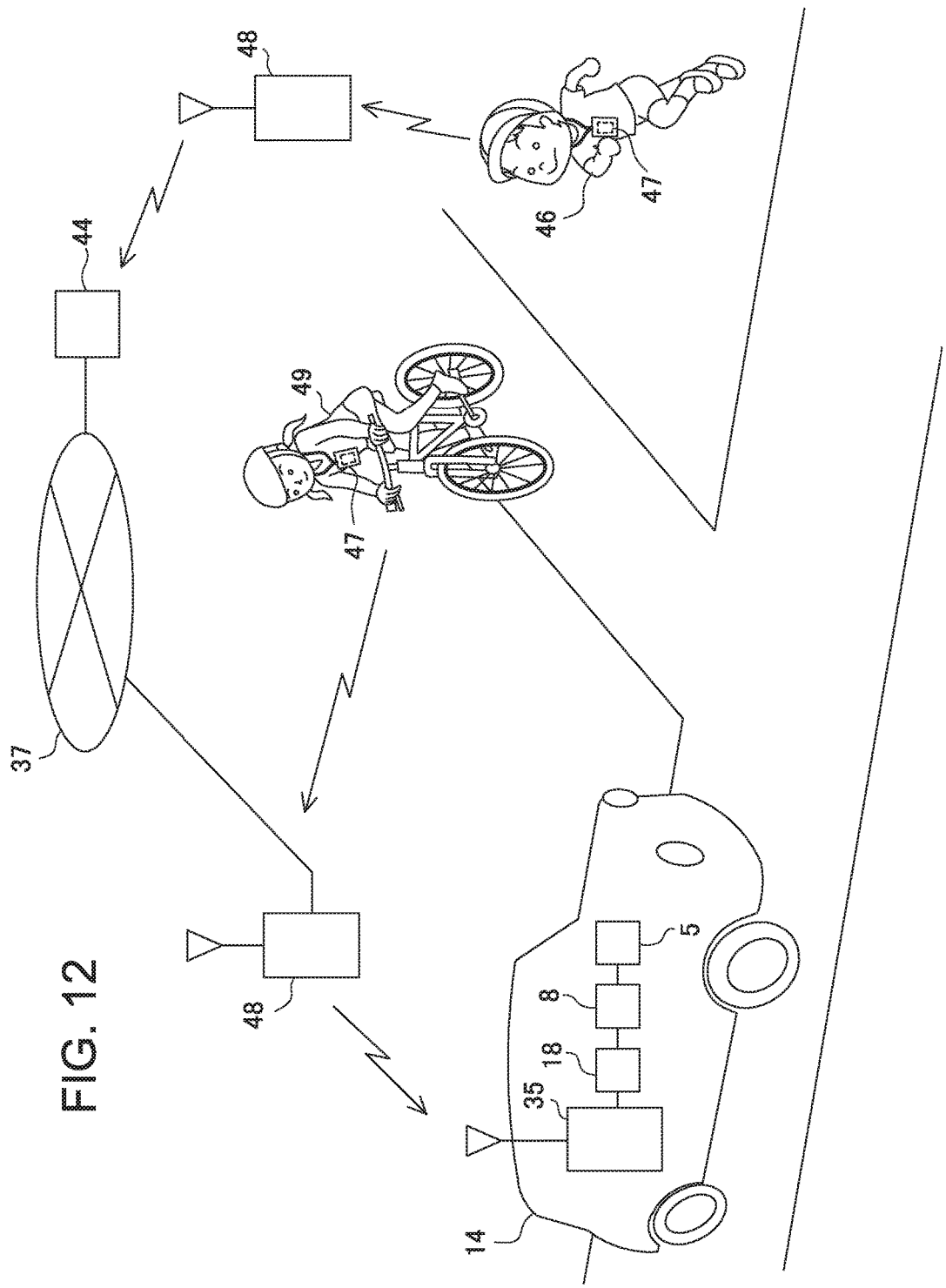
FIG. 12 is an explanatory view of a system configuration for operations of an approaching-body warning device using a communication chip attached to a person.

FIG. 12 illustrates a system in which a detection system 18 detects, as a detection target, a person who carries a card 47 in which such a communication chip is assembled. When the person carrying the communication chip card 47 is at or is moving through a road or the vicinity thereof, presence thereof is transmitted to a server 44 in the corresponding area through an antenna 48 arranged at intervals along the road, for example. In this case, it is preferable that the communication chip transmits a specific identification code representing that the communication chip is carried by a person in addition to own location information.

The detection system 18 obtains presence information of such a detected person from the server 38 in the area in which the own vehicle 14 travels through a communication device mounted on the own vehicle 14. Then, the detection system 18 calculates a distance between the person carrying the communication chip 40 and the own vehicle 14 and measures an approaching speed by calculating differential of the calculated distance. Then, the audio control unit 8 outputs, to the surround stereo audio system 5, surround signals to form a sound field in which the person being the detection target is approaching.

In the case that the person carrying the communication chip 40 is running or is on a bicycle, automobile, or the like, the travelling speed is larger than a normal walking speed. For example, when the travelling speed of the person carrying the communication chip 40 becomes larger than a specific value or becomes abruptly large, the audio control unit 8 outputs, to the surround stereo audio system 5, surround signals to form a sound field to inform the driver of the above situation in addition to an approaching direction to the own vehicle 14, a distance to the own vehicle 14, and the like. According to the above, danger such as abrupt rushing-out, for example, of a person or a bicycle from behind a building can be detected in advance, so that an accident can be avoided.

Here, in the detection system 18, it is possible to arrange an all-direction camera instead of or in addition to the front cameras 2, the rear cameras 3, or the radar sensor 4 in the abovementioned embodiment. In this case, it is possible to visually recognize situations all around the own vehicle 14 in a three-dimensional manner with an all-around image therearound.

The detection system 18 may adopt a detection system of each or combination of a server system using a satellite image system, a near field communication, the internet, and the like and the communication chips 40 arranged on roads or carried by persons. Further, by being combined with the radar sensor system and the imaging camera system described above, an approaching-body warning device being more reliable can be actualized.

The above is detailed description of the present invention. Here, not limited to the above embodiments, the present invention may be modified variously based on teaching of the present invention and such modifications are included in the scope of the present invention.

INDUSTRIAL APPLICABILITY

The present invention relates to an approaching-body warning device that detects a detection target approaching from an area surrounding an own vehicle and produces three-dimensional warning sound in accordance with a distance to and a location of the detection target with a surround method when approaching thereof is detected.

EXPLANATION OF REFERENCES

1 Approaching-body warning device
2 Front camera
3 Rear camera
4 Radar sensor
5 Surround stereo audio system
6 Speaker
7 Controller
8 Audio control unit
9 Front image recognition unit
10 Rear image recognition unit
11 Rear detection unit (Arithmetic unit)
14 Own vehicle
18 Detection system

The invention claimed is:

1. An approaching-body warning device, comprising:
a detection system configured to detect a detection target including an automobile, a bicycle, a person, an animal that approaches to a travelling own vehicle from a direction of all directions;
a surround stereo audio system including a plurality of speakers arranged in the own vehicle; and
an audio control unit configured to control the surround stereo audio system as storing a plural kinds of warning sound sources,
wherein the detection system includes an imaging camera system to take images of the detection target serially, a reference data file previously memorizing image features including an outline of the detection target, and an image recognition unit performing an image recognition process on the outline of the detection target based on the reference data file on images taken by the imaging camera system, the detection system evaluates danger of the detection target approaching to the own vehicle based on size variation of the outline of the detection target of the images taken serially, and the audio control unit controls a volume of the surround stereo audio system so that a single warning sound selected from the warning sound sources is audible three-dimensionally at a driver seat of the own vehicle in a direction of approaching of the detection target detected by the detection system when the detection system determines danger of the detection target approaching to the own vehicle.

2. The approaching-body warning device according to claim 1, wherein a determination of danger of the detection target approaching to the own vehicle based on the size variation of the outline of the detection target is determined based on a ratio of the outline of the detection target to the image taken.

3. The approaching-body warning device according to claim 2, wherein the ratio is set for each detection target.

4. The approaching-body warning device according to claim 1, wherein the detection system includes at least one imaging camera system, and at least one or a combination of a radar sensor system and a satellite image processing system, the radar sensor system is one or a combination of a millimeter-wave radar, a micrometer-wave radar, a laser radar, an infrared radiation sensor, and an ultrasonic sensor, and the radar sensor system includes a radar sensor configured to detect the detection target, and an arithmetic unit configured to calculate an inter-vehicle distance and a relative speed from a detection output of the radar sensor and a speed of the own vehicle and to evaluate approaching of the detection target.

5. The approaching-body warning device according to claim 4, wherein the satellite image processing system includes an arithmetic unit configured to calculate a distance between the detection target and the own vehicle based on image data in a vicinity of the own vehicle transmitted from a satellite orbiting an earth and to measure an approaching speed by calculating differential of the calculated distance.

6. The approaching-body warning device according to claim 4, wherein the imaging camera system includes at least one pair of cameras for taking images on front, rear, right and/or left of the own vehicle.

7. The approaching-body warning device according to claim 6, wherein the at least one pair of cameras is spaced apart from each other, the approaching-body warning device further comprising an arithmetic unit configured to measure an approaching speed by calculating a distance between the detection target and the own vehicle based on detection of a deviation between two image signals from the at least one pair of cameras and calculating differential of the calculated distance.

8. The approaching-body warning device according to claim 1, wherein the audio control unit controls the surround stereo audio system so that a frequency of the warning sound is varied in accordance with approaching of the detection target.

9. The approaching-body warning device according to claim 1, wherein the audio control unit controls the surround stereo audio system so that a volume of the warning sound is varied in accordance with approaching of the detection target.

10. The approaching-body warning device according to claim 1, wherein the audio control unit controls the surround stereo audio system so that, when the warning sound is produced intermittently at intervals, the intervals become short in accordance with approaching of the detection target.

11. The approaching-body warning device according to claim 1, wherein the audio control unit controls the surround stereo audio system so that, when detection targets are detected as approaching in different directions respectively, sound having different tone colors are concurrently produced as selecting warning sound sources each having a different basic waveform in accordance with a corresponding direction.

12. The approaching-body warning device according to claim 1, wherein, when the detection system detects approaching of the detection target during the surround stereo audio system is replaying audio, the audio control unit switches from the audio replaying to replaying of the warning sound source.

13. The approaching-body warning device according to claim 1, wherein, when the detection system detects approaching of the detection target during while the surround stereo audio system is not in operation, the audio control unit controls the surround stereo audio system to replay the warning sound source.

14. The approaching-body warning device according to claim 1, wherein, when the detection system determines that the detection target is approaching on the right or left traffic lane from the rear and the own vehicle is about to be moved to the traffic lane, the audio control unit controls the surround stereo audio system to produce the warning sound.

15. The approaching-body warning device according to claim 1, wherein, when the detection system determines that the detection target is present at the rear in a state that a transmission gear of the own vehicle is at a reverse position, the audio control unit controls the surround stereo audio system to produce the warning sound.

* * * * *